United States Patent [19]
Donovan

[11] 3,984,317
[45] Oct. 5, 1976

[54] APPARATUS AND PROCESS FOR CONTINUOUS CONCENTRATION AND WASHING OF SOLIDS FROM A SOLIDS-CONTAINING FLUID

[75] Inventor: James Donovan, Cambridge, Mass.

[73] Assignee: Artisan Industries Inc., Waltham, Mass.

[22] Filed: June 5, 1975

[21] Appl. No.: 583,974

[52] U.S. Cl. ............................. 210/65; 210/314; 210/334; 210/415
[51] Int. Cl.[2] ........................................ B01D 37/00
[58] Field of Search ................. 210/65, 66, 70, 74, 210/196, 298, 314, 331–334, 413–415

[56] References Cited
UNITED STATES PATENTS

| | | | |
|---|---|---|---|
| 3,252,577 | 5/1966 | Anderson | 210/334 X |
| 3,437,208 | 4/1969 | Kaspar et al. | 210/331 X |
| 3,455,821 | 7/1969 | Aremaa | 210/414 |
| 3,477,575 | 11/1969 | Nemec et al. | 210/332 X |
| 3,785,969 | 1/1974 | Molls et al. | 210/415 X |
| 3,884,813 | 5/1975 | Donovan et al. | 210/332 |
| 3,885,805 | 5/1975 | Bagdasarian et al. | 210/65 |

*Primary Examiner*—Charles N. Hart
*Assistant Examiner*—Richard W. Burks
*Attorney, Agent, or Firm*—Richard L. Cannaday; William J. Ungvarsky; Robert T. Tobin

[57] ABSTRACT

Apparatus for concentrating and washing solids in a slurry comprising a housing containing both separation/concentration and washing chambers with an inlet for continuously injecting solids — containing fluid into the separation chamber wherein a dynamic filtering system is provided for separating the solids — containing fluid to form a cencentrate of solids and a filtrate. The filtering system includes a plurality of stationary filter elements and a plurality of rotor elements mounted on a rotatable shaft from which they extend outwardly and adjacent the filter elements to form a plurality of alternating rotor and filter elements within the housing. The concentrate washing chamber is disposed downstream of the filtering system and includes a plurality of stationary filter elements and a plurality of rotor elements arranged similarly to the elements in the filtering system. The washing chamber also includes means for introducing and commingling a wash fluid with the concentrate to remove impurities therefrom by dissolving said impurities or diluting the liquid containing them and then removing the liquid by further filtration. One embodiment is described wherein a single continuous upstream injection and continuous downstream removal of wash fluid is provided in the washing chamber. Another embodiment comprises a continuous downstream injection with continuous removals and reinjections of wash water in sections progressing in an upstream direction from the initial downstream injection until final withdrawal at the extreme upstream section of the washing chamber. In still another embodiment fresh wash fluid is simultaneously injected and removed continuously in each of a plurality of separate sections of the washing chamber.

20 Claims, 5 Drawing Figures

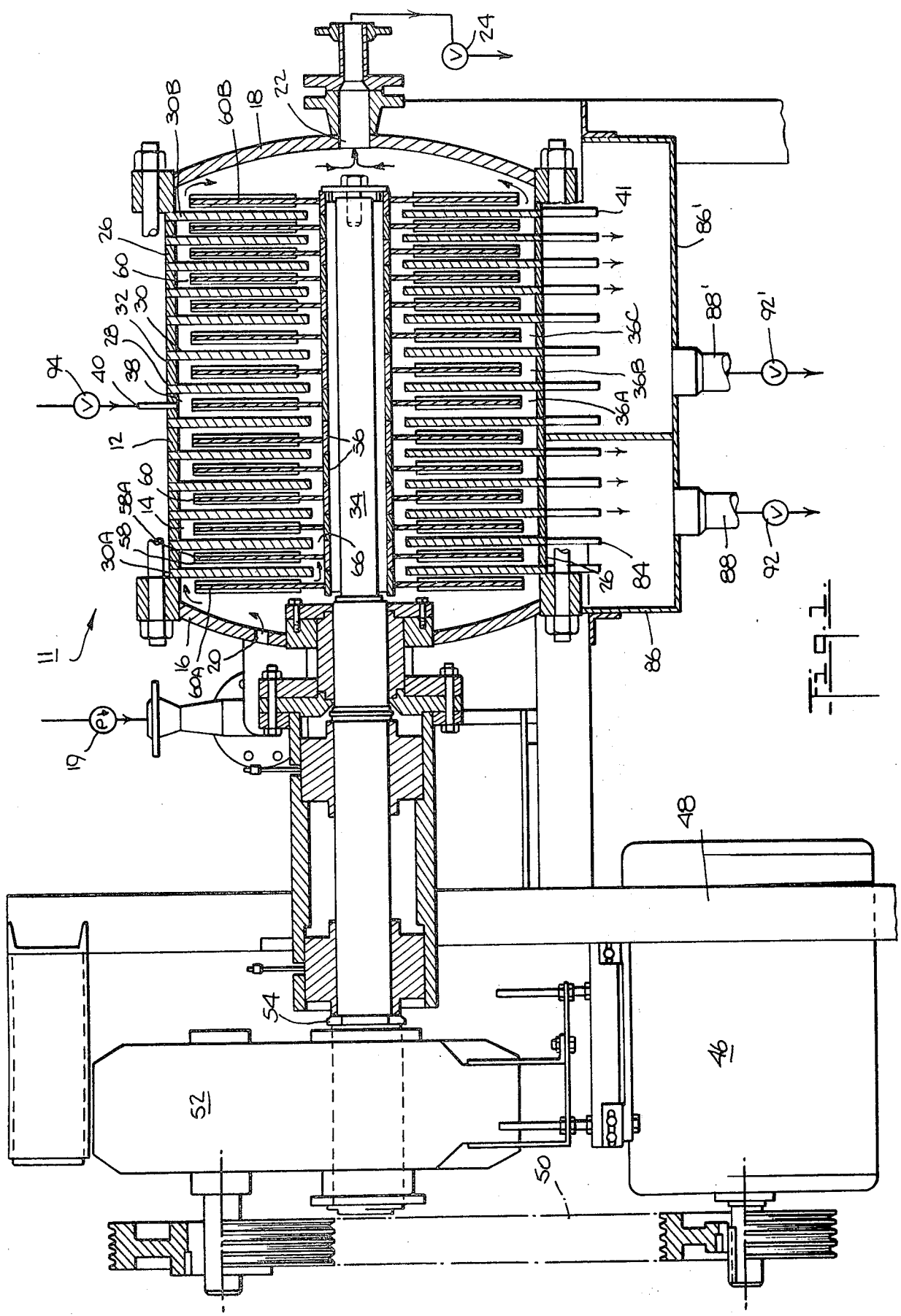

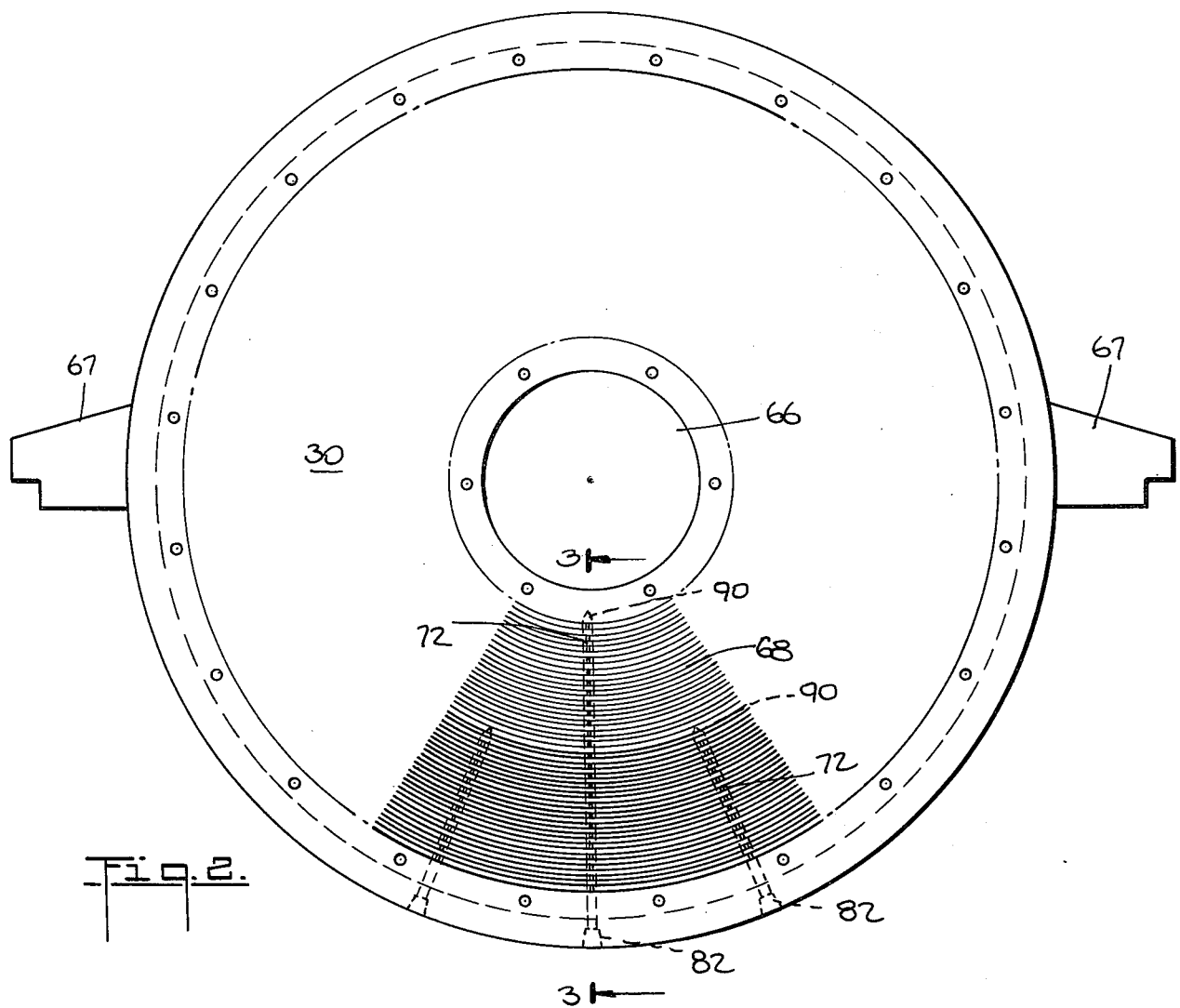
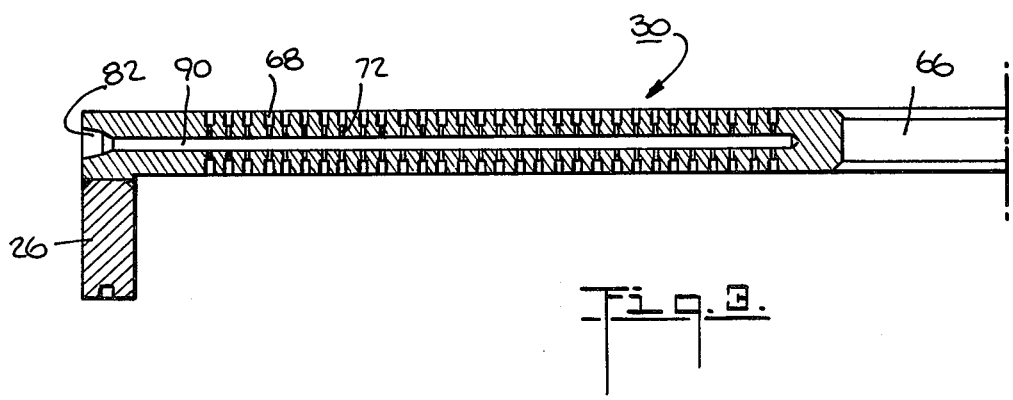

APPARATUS AND PROCESS FOR CONTINUOUS CONCENTRATION AND WASHING OF SOLIDS FROM A SOLIDS-CONTAINING FLUID

BACKGROUND OF THE INVENTION

This invention relates to an apparatus and process for separating and washing a concentrate of solids from a solids-containing fluid. More particularly, this invention relates to a concentrator-washer and process for dynamically separating a filtrate and a concentrate of solids from a solids-containing fluid and washing impurities from the concentrate in a continuous process within one apparatus.

Various types of filtration devices have heretofore been known for concentrating the solids content of a fluid. For example, U.S. Pat. No. 3,437,208 describes a device wherein a solids-containing fluid is pumped under pressure across the filtering surfaces of assembled hollow filter members so that a portion of the fluid is passed through the filtering surfaces and into the supporting filter member structures. The fluid is thereafter removed as a filtrate, and solids tending to remain on the filtering surfaces during the filtering operation are continuously returned into the solids-containing fluid to increase the concentration of solids within the filtration device and thereby form a thickened slurry for subsequent removal from the device. U.S. Pat. No. 3,437,208 also describes a series of filtering and washing steps utilizing the vessels of three separate filtration devices interconnected by conduits. Each of the filtration devices has a hollow shaft. The hollow shaft of the first filtration device carries off filtrate from the first vessel, and the second vessel is provided with a hollow shaft for discharging wash liquid as waste. Wash liquid from the third vessel, removed through the hollow shaft of the third vessel, is added to the second vessel and thus removed as waste through the hollow shaft of the second vessel. Fresh wash liquid is added to an inlet in a conduit between the second and third vessels which carries the slurry output of the second vessel. U.S. Pat. No. 3,437,208 indicates that for the described apparatus to be housed in a common vessel partitions must be provided in the vessel as well as a hollow shaft with independent channels for carrying off the filtrate and the wash liquid.

In U.S. Pat. No. 1,264,635 a filter and wash system is described in which six separate filter units are used. Three of the filter units separate sludge from filtrate and three are used as washers to wash the sludge. The three washer units are arranged in series with the first washer unit receiving all the sludge from the three filter units A, A$^1$, and A$^2$. Wash liquid in washer unit 1 is supplied by the liquid from washer unit 2. The wash liquid removed in washer unit 1 is then added to the unfiltered material passed through the filter units A, A$^1$, and A$^2$. The sludge in turn removed from washer unit 1 together with the wash liquid from washer unit 3 is then added to washer unit 2. The sludge from washer unit 2, together with fresh wash water is then added to washer unit 3 from which the sludge is removed while the the wash liquid is recycled to be added to the sludge coming from washer unit 1 and going into washer unit 2.

In contrast to the teachings of U.S. Pat. Nos. 3,437,208 and 1,264,635, the apparatus of the present invention is a unitary device which is contained within one housing which avoids the necessity and expense of a hollow shaft having independent channels for carrying off filtrate and wash liquid as in U.S. Pat. No. 3,437,208. Further, the device of this invention in contrast to the '208 patent does not require partitions between the separating and washing chambers but instead has dynamic means in the form of rotating discs between the filter elements. Further, in contrast to U.S. Pat. No. 1,264,635 in which the concentrate is formed as a precipitate on the bottom of the device after being squeezed out of the input material between two counter-rotating filter discs, the concentrate generated in and by the apparatus and process of this invention is continuously formed as the filtrate is removed from the solids-containing fluid as it is advanced through the concentrating and washing chambers of the apparatus.

Means have also heretofore been known for cleaning an accumulation of solids material which has deposited on the surfaces of filtering diaphragms in filtration devices. In some instances, such filtration devices have been periodically dismantled to remove the filtering diaphragms for cleaning purposes. In other instances, a backwash arrangement has been used to wash the solids deposited on the filtering surfaces, for example, by means of water forced into and through the interior of a hollow filter and through the filtering diaphragms. In still other instances, such as is described in U.S. Pat. No. 1,000,540, a filter cake has been produced in a centrifugal device by the centrifugal separation of the solids from the filtrate. Subsequent to the formation of the filter cake it is washed by adding wash water to the interior of the centrifuge through the same valve and piping as the centrifuge material. After the filter cake has been washed the machine is disassembled and the cleaned filter cake is removed from the machine. Each of these washing processes is a discontinuous process which requires a shutting down and dismantling of the apparatus.

Other examples of discontinuous processes are found in U.S. Pat. Nos. 1,920,126 and 3,108,951. Thus, in U.S. Pat. No. 1,920,126 solid material such as wax contained in wax-bearing mineral oil is separated in a filter press and washed with a solvent which is added within the interior of the filter press after the formation of the filter cake. The solvent addition is continued until the cake is completely washed. The press is then opened and the cake removed. In U.S. Pat. No. 3,108,951 a filter cake in a centrifugal device is washed after formation of the cake within the centrifuge by the addition of wash water which is then centrifugally passed through the cake to wash the cake.

Apparatus is also known for refining oil, such as shown in U.S. Pat. No. 956,065 in which liquids containing oil are forced through a plurality of screens which break up the liquid and separate the impurities therefrom. In that apparatus provision is also made for adding gas, air or other fluid material to carry out the purifying process for the liquid. Also, a method is described in U.S. Pat. No. 3,346,418 for washing impurities from clay-like and jelly-like materials by continuous addition and removal of a liquid medium which is a solvent for the impurities, the removal occurring upon passage of the particle-carrying liquid through a porous tube.

Other processes are known for separating or extracting soluble impurities from a solid by counter-flowing a solvent through the solid material. These processes shown, for example, in U.S. Pat. Nos. 2,547,577, 2,686,192, 2,998,307, 3,111,393 and 3,275,472 operate by adding a fresh solvent to the solids at the last stage of the extraction process, collecting that solvent and progressively adding, collecting, and introducing the contaminated solvent to the preceding stages of the process. This method of adding solvent operates to extract soluble material by counter-flowing the solvent through the material as it progresses through the device.

Thus, while many varied processes and devices have been proposed for either separating a solid, washing a solid, or extracting soluble material from a solid, no process or apparatus has heretofore been known for preparing a washed concentrate from a solids-containing fluid by a continuous process in which the solids-containing fluid has the solids separated, concentrated and washed on a steady basis in a dynamic concentrator-washer within and incorporating a unitary housing as taught according to the present invention.

OBJECTS OF THE INVENTION

It is an object of the present invention to provide a unitary apparatus and process for not only separating solids in a solids-containing fluid from a vehicle fluid or filtrate to form a concentrate but also washing impurities from the concentrate.

It is a further object of this invention to provide an apparatus and process for continuously separating, concentrating and washing the solids of a solids-containing fluid by using a unitized continuous dynamic filtration device having rotating disc members as agitators for the concentrate and stationary filtering elements acting to remove the vehicle fluid or filtrate and the wash liquid.

It is a further object of this invention to provide a unitized apparatus having the capability of continuously washing a solids concentrate simultaneously with separating that concentrate from a solids-containing fluid and keeping on washing the concentrate after the fluid has been separated from the concentrate.

It is a further object of this invention to provide a dynamic apparatus having the capability of separating a vehicle fluid or filtrate and a concentrate of solids from a solids-containing fluid, and of washing the separated concentrate by a separate wash fluid without utilizing a hollow rotor with separate piping for the filtrate and the wash liquid or fluid.

SUMMARY OF THE INVENTION

Briefly, the invention provides a concentrator-washer having separate concentrating and washing chambers within a unitary housing. An inlet is provided in the housing for the introduction into the concentrating chamber of a pressurized solids-containing fluid and, downstream of the washing chamber, an outlet is provided in the housing for the discharge from the concentrator-washer of a concentrated slurry of washed solids. At least one inlet is also provided in the housing for the introduction of a wash fluid into the washing chamber. Further, in both the concentrating chamber and the washing chamber, at least one stationary or rotating filter element is provided in each chamber, each of the filter elements having at least one filtering surface and a suitable drainage system for the removal of a filtrate (in the concentrating chamber) and the wash fluid (in the washing chamber). Rotating or stationary discs are mounted between adjacent filter members. The concentrator-washer further has a rotor including a shaft which is rotatably mounted on a longitudinal axis within the concentrating and washing chambers coaxially of the filter elements. If the design selected be one in which the filter elements rotate, the disc members may be mounted on the relatively stationary housing. Alternatively, if the filter members be mounted relatively stationary, the disc members may be mounted on the rotating shaft.

In the washing chamber after the wash fluid is introduced into the housing it is commingled with the concentrate to, for example, dissolve soluble impurities within the concentrate. At the same time the wash fluid may be considered to dilute the impurity-containing fluid present already and then that liquid or fluid as so diluted to be removed by a filtration step, thus reducing the amount of impurities remaining in the solution which wets the concentrate. A wash fluid outlet provided in and on the housing of the concentrator-washer drains the wash liquid therefrom as that liquid is mixed with original or vehicle liquid or fluid containing feed material impurities in the manner described. The invention may be employed to wash salts, an acid or an alkali out of the concentrate and, by way of further utility and example, may be employed also with a suitable solvent to wash an organic material such as tar out of the concentrate.

In one embodiment of the invention a unitary concentrator-washer is provided with a split rotor shaft wherein the concentrator portion of the apparatus has its rotating members coupled to one motor drive, and the washer portion of the apparatus has its rotating members coupled to a different motor drive. By this means greater or at least independently controllable motive power may be provided to the rotating members in the portion of the unit where the material being processed has the higher solids concentration, and thus is more viscous and resistive to flow. If desired, a single motor may be employed with a suitable transmission to provide different rotor speeds in the two portions of the unit.

In another embodiment to the invention a concentrator-washer has a plurality of filter elements and a plurality of rotatable discs disposed coaxially in an alternating manner about a rotatable shaft. The filter elements are of hollow construction to permit passage of filtrate and wash fluid through the filter. By arranging the filters and rotating discs in alternating positions and utilizing a plurality of blades or vanes upon the surface of the discs, those vanes projecting laterally toward the filtering surface of the adjacent filtering element and in the general direction of the longitudinal axis of the rotor, the solids-containing fluid progresses through the concentrating chamber of the concentrator-washer by passing through one subchamber formed between filtering elements to a downstream subchamber. As it progresses through the concentrating chamber, fluid is continuously removed as a filtrate from the on-flowing solids-containing material, and the thickened or concentrated solids are gradually dried in the sense of their vehicle fluid being filtered out. That dried material, while having fluid removed, may still contain insoluble or soluble, dissolved impurities.

To remove those impurities a washing chamber is provided within the apparatus having at least one solvent or wash fluid injection port mounted on the housing between a disc and filter element. By injecting the solvent or wash fluid into this stage, section or subchamber of the washing chamber the sinuous path of the concentrate, coupled with the forces exerted upon the concentrate by the rotation of the discs and the stationary position of the filters, works or commingles the solvent or wash fluid into the concentrate and dissolves the soluble impurities in the concentrate. Downstream of the injection port the contaminated wash fluid is removed through a drainage port connected to the next filtering element and through the wash fluid outlets of the filter. Diluted originally present and impurity-containing liquid mixed with the wash fluid as described hereinbefore is removed also. Thus, the previously dried concentrate, now wetted by the wash fluid added through the wash fluid injection port, is passed over the filtering element, and the wash fluid is purged from the concentrate by the filter element.

In the manner just described the dried concentrate, momentarily reliquefied by the wash fluid, is returned to its original dry state by the filtering action of the next filter element in the washing chamber. Further, if washing fluid be continuously injected at the same rate as wash fluid is removed, a continuous operation may be obtained which washes but does not thin the concentrate being processed by the unit, i.e., a concentrate may be obtained which comprises solids in a cleaner fluid without a substantial change in the mass of the combined material. Still further, by using a wash fluid in which undesirable solid constituents of the concentrate are soluble, or which chemically reacts with undesirable solid constituents to produce a liquid or gaseous fluid, a concentrate may be obtained which is thinned as well as washed.

Depending upon the condition of the material, one or more solvent or wash fluid injection and removal or drainage ports may be needed. Further, in order to completely remove the added fluid it may be necessary to pass the material, subsequent to wash fluid addition, through one or more stages or subchambers, progressively removing the added fluid through the filter element at each subchamber or stage.

The wash fluid removed in the washing chamber, depending upon the type of material, its condition and the nature of the impurities, may either be discarded or returned back into the washing chamber and used again as wash fluid, or alternatively, if required to thin or fluidize the feed material, may be added to the feed material in the concentrating chamber of the apparatus. Thus, in one embodiment the wash liquid is recycled to an earlier washing stage or subchamber in the washing chamber, used as a wash liquid and then purged out of the concentrate. That fluid, now more contaminated than when originally added to the device, but still capable of dissolving impurities, is again injected into the device and flows into an earlier, more contaminated concentrate stage in the washing chamber. In that manner, by progressively advancing the washing fluid from one stage to an earlier stage, the wash fluid is continuously recycled and used over and over while the concentrate is simultaneously purged of fluids and purified of soluble inpurities.

In summary, the apparatus and process of the present invention separates solids from a solids-containing fluid and then "washes" the solids by use of one or more of the following particular processes which of course include the liquid or fluid mixing concept, i.e., dilution concept, for impurity reduction as explained above as well as the concept of impurity dissolution in or simple washing of the solids.

1. Injecting a substantial amount of fresh washing fluid at a single intermediate point in the washing chamber at which the concentrate has achieved approximately its desired degree of dryness, with that fluid and the undesired materials, e.g., salts, washed out by the fluid being removed from the washing chamber through the wash fluid drains from several downstream sections or stages following wringing out or expressing and, in effect, redrying operations on the rewetted concentrate in those sections or stages.

2. Injecting a limited amount of fresh washing fluid at each of a plurality of points successively downstream beginning at about the same intermediate point as before, the amount injected at any particular point being essentially wrung out of the concentrate and drained from the washing chamber along with any undesired materials picked up by the wash fluid by the time the next injection point is reached so that the whole washing operation comprises alternating steps of limited rewetting and restoration drying.

3. Injecting a limited amount of fresh washing liquid close to the concentrate discharge end of the washing chamber where the concentrate has achieved approximately its desired degree of dryness; wringing out that liquid and its picked-up undesired material in at least one more operating stage of the washing chamber and draining the now somewhat contaminated wash fluid from the concentrator; injecting the wash fluid as so contaminated into the washing chamber at a point at least one section upstream from or above the point of its initial injection; wringing out that liquid with additional contaminant in the following section and draining it from the washer ahead of the point of initial injection; injecting the additionally contaminated wash fluid into the washer at a point at least one section ahead of the point of second injection, etc., etc., and in that way working upstream in counterflow fashion with injections of a limited amount of increasingly contaminated wash fluid.

BRIEF DESCRIPTION OF THE DRAWINGS

The nature and substance of the present invention as well as its objects and advantages will be more clearly perceived and fully understood from consideration of the following detailed description and appended claims taken in conjunction with the accompanying drawings in which:

FIG. 1 is a side elevation view, in cross-section, of a concentrator-washer constructed according to this invention including a plurality of coaxially mounted rotor disc elements and interposed filter elements, and having wash fluid injection and removal ports;

FIG. 2 is an end elevation or face view, partly fragmented, of the grooved disc member of a filter element employed in the invention;

FIG. 3 is a cross-sectional view of a filter element grooved disc taken along line 3—3 in FIG. 2 looking in the direction of the arrows;

DESCRIPTION OF THE PREFERRED EMBODIMENTS

Figure 4:
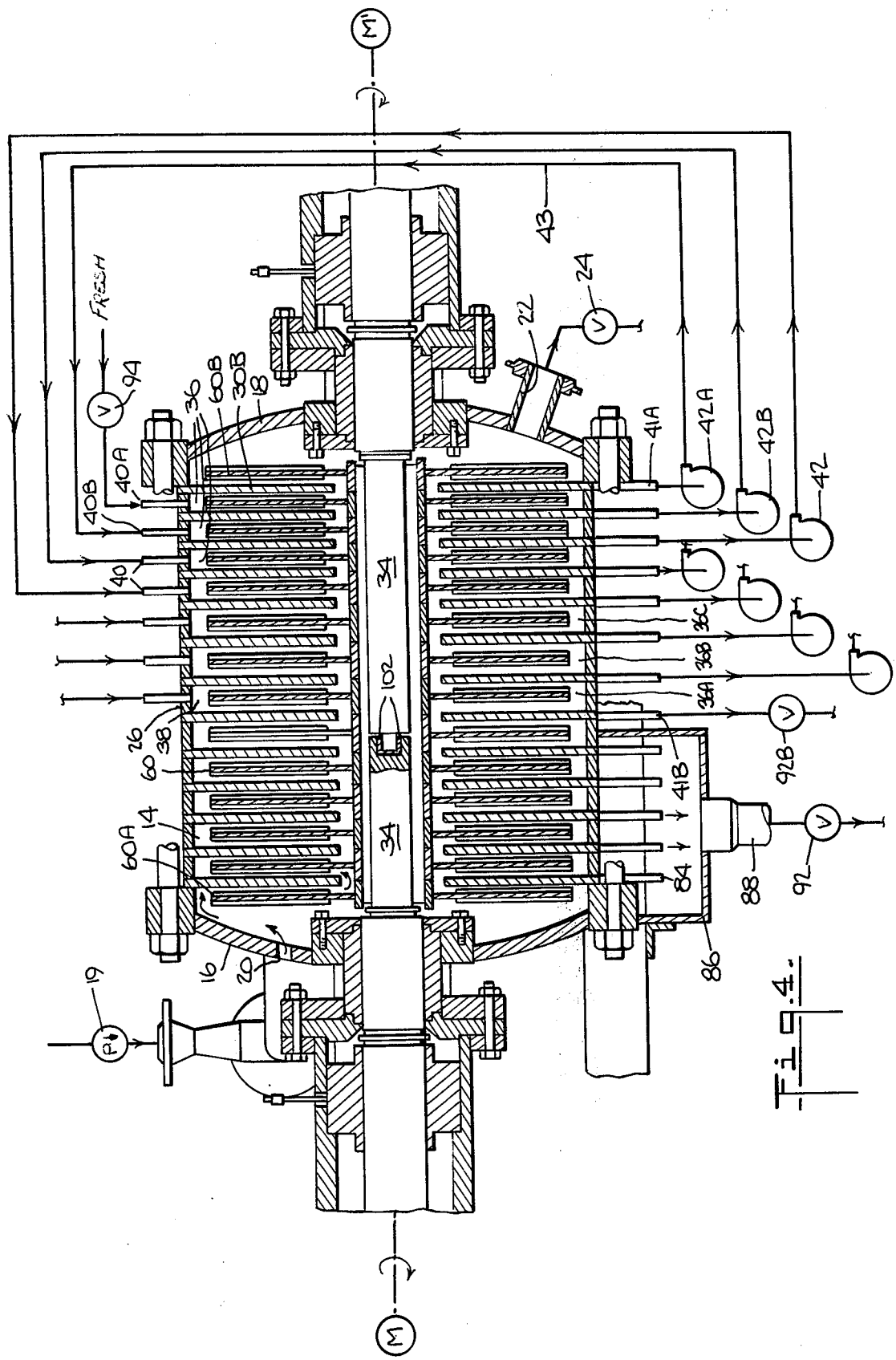
FIG. 4 is a side elevation view, partly in cross-section, of a concentrator-washer constructed according to this invention including a plurality of coaxially mounted rotor disc elements and interposed filter elements, and having wash fluid injection and removal ports with pumps arranged to provide a counter-current wash fluid flow path within the apparatus.

Referring now to the drawings in detail, the concentrator-washer 11 illustrated in FIG. 1 is constructed with a composite or built-up housing 12 which bounds a concentrating chamber 14 and a washing chamber 38 within the housing. The concentrator-washer 11 is provided with a pair of end plates 16,18 at its opposite ends, and the front end plate 16 is provided with an inlet port 20 and the rear end plate 18 is provided with an outlet port 22. In addition, the spigot for the outlet port 22 has mounted thereon a control valve 24, which may be a manually operated valve, for controlling the flow of material from the outlet spigot. The housing 12 shown in FIG. 1 is comprised of a series of spacer rings 26 each of which has an annular side 28 secured as by welding to one adjacent filter element 30, and an opposite annular side 32 which abuts another adjacent filter element 30. The spacer rings 26 and filter elements 30 are mounted in alternating fashion to define peripherally the concentrating and washing chambers 14, 38 with each filter element 30 (except one filter element 30B near the rear end plate 18) having a spacer ring secured to it to form a unitary assemblage of a filter element 30 and an adjacent spacer ring 26.

As shown in FIG. 1, a wash fluid injection port 40 is provided on and in the concentrator-washer 11 passing through an intermediately located spacer 26 into the washing chamber 38 which, like the concentrating chamber 14, is enclosed by the housing 12 of the concentrator-washer 11. Depending upon the type of material being processed and the operating characteristics desired for the concentrator-washer, single or multiple injection ports 40 may be provided in the washing chamber 38 downstream of the concentrating chamber 14. Solids-containing liquid or fluid material supplied to the concentrator-washer 11 through inlet port 20 will first be dried or concentrated by having a substantial amount of its vehicle fluid removed through the filter elements 30 in the concentrating chamber 14. Then the resulting concentrate will pass into the washing chamber 38 and past the wash fluid injection port 40 where the concentrate is diluted or reliquefied by wash fluid injected through the port 40.

Internally the concentrator-washer 11 shown in FIG. 1 has a rotor shaft 34 which passes through front end plate 16 of housing 12 and terminates within washing chamber 38 at a point spaced from rear end plate 18. A plurality of radially extensive elements 60 (FIG. 5) are mounted on rotor shaft 34 within the concentrating chamber 14 in a secured manner to be rotated with the shaft as by a key 62. Radial elements 60 are of solid, i.e., non-hollow, construction, and are disposed in alternating fashion with annular filter elements 30. Each radially element 60 other than elements 60A and 60B near front end plate 16 and rear end plate 18 respectively is generally within a subchamber of concentrating chamber 14 or washing chamber 38 bounded by a unitary assemblage of a filter element 30, a spacer ring 26 and a surface of an adjacent filter element 30. Each radial rotor element 60 including elements 60A and 60B is disc-like in general configuration with an outer diameter which is less than the inside diameter of concentric spacer rings 26. Further, each rotor disc 60, 60A and 60B is spaced longitudinally from the adjacent end wall 16 or 18 and/or from adjacent filter elements 30 30A, 30B. This spacing helps provide a flow path for a solids-containing fluid from inlet spigot 20 through concentrating chamber 14 and washing chamber 38 to outlet spigot 22 of the concentrator-washer, that flow path being of a sinuous nature overall as generally indicated by arrows in FIG. 1.

A drive motor 46 is provided which is mounted on a frame 48 outside of housing 12. The drive motor is coupled by V-belts 50 to a speed-control power transmission unit 52 also mounted on frame 48. Power transmission unit 52 is in turn connected to a drive shaft 54 which is coupled to rotor shaft 34 of concentrator-washer 11 through suitable bearings and seals. By means of motor 46 and transmission unit 52, which can be a manually controlled unit, the rotor shaft may be driven at preselected speeds.

Figure 5:
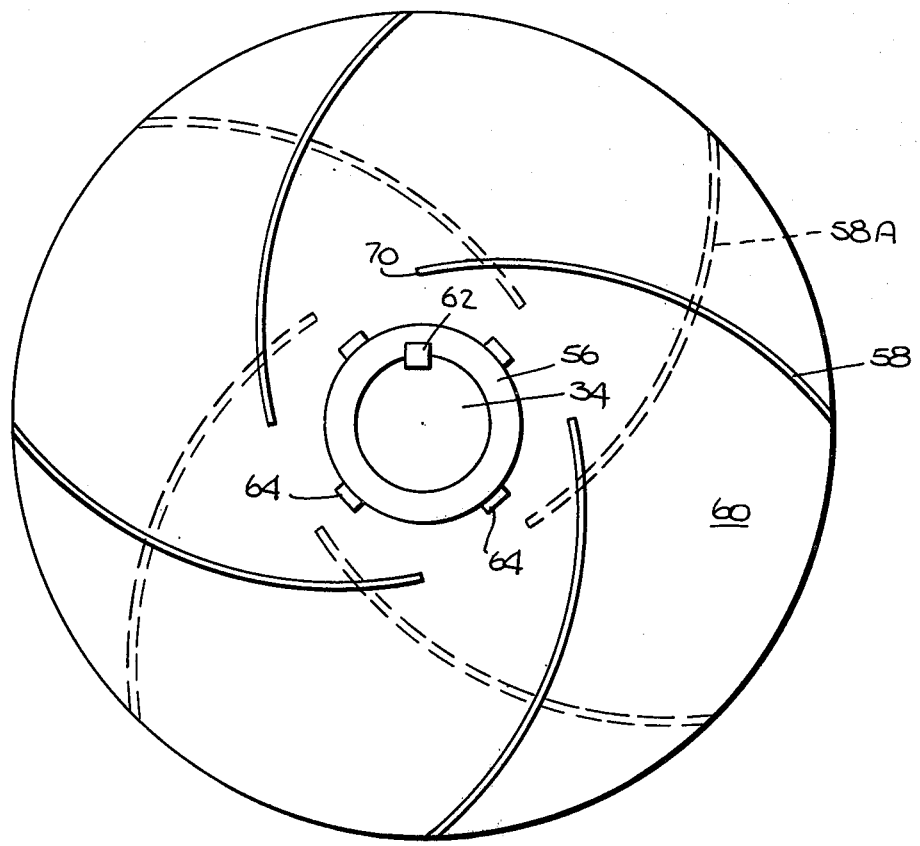
FIG. 5 is an end elevation or face view of a radially extensive, rotary disc element employed in the apparatus of this invention.

As shown in FIG. 5, each radial rotor element 60 is secured as by welding to a collar 56 mounted on rotor shaft 34. Each rotor element 60 is provided with four or more equally spaced blades or vanes 58, 58A on each of its radial surfaces which project from those respective surfaces towards an adjacent filter element 30 when the rotor element is in place in the housing 12 of the concentrator-washer 11. The blades 58, 58A each extend in a curved path from a point 70 adjacent but spaced apart from collar 56 to the outer periphery of the rotor element. For any rotor element 60 the curvilinear configuration of the blades 58 on one radial surface thereof is an image of the configuration of the blades 58A on the opposite surface of that rotor element as shown in FIG. 5. Each rotor element 60 is mounted on rotor shaft 34 such that the impulse imparted to solids-containing fluid contacted by its blades 58, 58A corresponds in direction to advancing movement along the flow path on each side of the rotor element as indicated generally by arrows in FIG. 1. Thus for a given direction of rotation the blades on one side direct fluid outwardly of the rotor element while the blades on the opposite side direct fluid inwardly.

As shown in FIG. 1, the blades 58, 58A project laterally toward either an adjacent filter element 30 or an end plate 16,18. As shown in FIG. 5, each rotor element 60 has four equally spaced fluid passages or openings 64 along its periphery adjacent its collar or hub 56. Those passages serve to permit a portion of the solids-containing fluid within concentrating chamber 14 to flow through rather than sinuously around the rotor elements. In other embodiments according to this invention passages 64 can be omitted or, alternatively, passages may be provided for flow of fluid elsewhere through the rotor discs, for example, adjacent their outer peripheries, to vary the flow paths.

Each filter element 30 in both concentrating chamber 14 and washing chamber 38 comprises an annular disc shown especially in FIGS. 2 and 3 which is characterized by an opening 66 for passage therethrough of the rotor shaft 34. Opening 66 is sufficiently large to allow adequate process flow of solids-containing fluid between the inner periphery of the filter element and the outer surface of the rotor shaft and/or that of any hub or collar 56 on that shaft. There are a pair of oppositely disposed lugs or ears 67 on each filter element disc for providing vertical support and alignment of it and the entire filter element assembly of which it is a component on horizontal rails (not shown) of the structural framework in and on which the assembled housing 12 rests. The structural filter disc is characterized further by a plurality of spaced-apart concentric grooves 68 on each face as well as a plurality of radial bores 90, such as for example three, which have outlet ports 82 and which communicate along the lengths of the bores 90 with grooves 68 through passages or openings 72. Each filter element, as an assembly, includes one or a plurality of filter surfaces formed, for example, by filter cloths as of polyester material secured on and to opposite sides of the grooved filter disc. For details of such assembly, not shown here, reference may be had especially to FIG. 5 of U.S. Pat. No. 3,884,805 on which the present Applicant is one of two coinventors.

Referring to FIGS. 1 and 3, the ports 82 of the radial bores 90 are in fluid communication with drains 84 and 41 which extend into partitioned or isolated collection pans 86 and 86' respectively. The filtrate collection pan 86 for the concentrating chamber 14 has a discharge nozzle 88 extending outside the concentrator-washer to carry off filtrate, with a valve 92 being provided to control the flow of filtrate from the concerned pan. As shown in FIG. 1, collection pan 86' for washing chamber 38 has a similar discharge nozzle 88' and control valve 92'. The reason for providing separate, non-communicating drain or collection pans is that the material flowing out of drains 84 will be essentially just vehicle fluid while that flowing out of drains 41 will be a mixture of wash fluid, dissolved impurities and some residual vehicle fluid. It may well be desirable to keep the materially different drainages isolated for recovery and reuse of at least one of them.

In FIG. 4 a further embodiment of this invention is illustrated in which parts which correspond to those of the embodiment of FIG. 1 are indicated by identical numbers. In the embodiment of FIG. 4 several wash fluid injection ports 50, 40A, 40B are provided in spaced relation along the length of the illustrated concentrator-washer in its washing chamber region or portion to enable a countercurrent flow of wash fluid from one washing stage or subchamber 36 of the washing chamber to the adjacent up-stream washing stage 36. In this embodiment drains 41, 41A are connected to each filter element 30, and pumps 42, 42A, 42B are provided on the drains 41, 41A from which it is desired to recirculate wash fluid to an adjacent up-stream washing stage 36. In operation, fresh wash fluid is added to the concentrate through an injection port 40A nearest the concentrate discharge end of the apparatus having a valve 94 for controlling the rate of addition. The newly added wash fluid, together with vehicle fluid and any other fluid still present in the concentrate, is removed through filter element 30B the last filter element in the washing chamber, and its drain 41A. This combined fluid is picked up and delivered by a pump 42A back through pipe 43 to the injection port 40B next upstream of the original wash fluid injection port 40A.

As shown in FIG. 4, the fluid injected or reinjected at port 40B is in turn removed through a drain next upstream of drain 41A; picked up and delivered by a pump 42B for injection into the immediately preceding washing stage 36; withdrawn through the drain 41 associated therewith, and then picked up and delivered by a pump 42 for injection into the next preceding washing stage, etc., etc. This process of injection and mixing, filtration and removal, pumping and reinjection may be continued as desired and the wash fluid injection and removal controlled as appropriate to the particular type of material being treated, or to the condition of the concentrate at the point at which the concentrate is advanced into washing chamber 38. The wash fluid finally removed from near the upstream end of the washing chamber through drain 41B and its control valve 92B may be either discarded, treated for recovery of the impurites or treated for recovery of the fluid itself.

As shown in FIGS. 3 and 4, the filter element radial bores 90 and outlets 82 in the washing chamber are connected to drains 41, 41A, etc., and pumps 42, 42A, 42B, etc. Piping 43 returns the wash fluid removed through filter element 30B to injection port 40B where it is recycled and commingled into the concentrate passing beneath that port. That fluid, mixed with and serving to dilute liquid or fluid present already in the concentrate, is in turn removed by the adjacent downstream filter element 30 and recycled through the appropriate bores 90, outlets 82, drains 41 and pump 42A back into the next preceding washing section 36. This recycling procedure according to which wash fluid is worked upstream through successive washing sections conserves wash fluid as it calls for repeated use of that fluid in the operation of the apparatus.

The concentrator-washer of FIG. 4 is provided with a split rotor shaft 34, each portion of which has a separate motor drive. Thus, the drive motor M for the portion of the rotor shaft within concentrating chamber 14 is separate from the drive motor M' for the portion of rotor shaft 34 within washing chamber 38 of the concentrator-washer. A suitable journal and bearing arrangement 102 interconnects the two portions of the rotor shaft 34 to provide mutual support and alignment for the facing ends of those shaft portions. By using separate drive mechanisms, the concentrating and washing functions of the apparatus may be controlled and regulated independently through different rates of rotation being imparted to the two segments or portions of the rotor shaft.

Reverting now particularly to the embodiment illustrated in FIG. 1 to describe the operation of the apparatus of this invention, a solids-containing fluid is supplied under pressure from and by pump 19 to inlet 20 for concentrator-washer 11. At the same time, rotor shaft 34 is caused to revolve by drive motor 46. The consequent rotation of radial rotor elements 60 and their blades 58 and 58A causes the major portion of the entering fluid to disperse about the initial rotor disc 60A, and thereafter follow a flow path which meanders sinuously about the stationary filter elements 30 and the remaining, interposed rotor elements 60, toward final rotor element 60B and the concentrate outlet 22 of the concentrator-washer. Concurrently a minor portion of the solids-containing fluid flows essentially along the shaft through openings 64 in the radially extensive rotor element (see FIG. 5). As the solids-containing fluid moves through concentrating chamber 14 around and across each successive filter element 30 in and adjacent its flow path, its vehicle fluid component passes as a filtrate through the filtering surfaces of the filter elements, then out of the interior of the filter elements through their radial bores 90 and outlets 82, and then into filtrate collection pan 86 from which it is removed through discharge nozzle 88.

When solids-containing fluid moving through concentrating chamber 14 has been processed sufficiently to form a thickened slurry of desired concentration, say for example a slurry with 50% solids, that concentrate is then washed within the washing chamber of the unitary concentrator-washer. Thus, while filtrate was removed from the solids-containing material as it passed through the concentrating chamber, that material may still contain undesired fluid or particulated impurities. Water may be used as a wash fluid to remove salts from a concentrate, and suitable solvents may be used to wash out alkali, acids or an organic contaminant such as tar. Additionally, instead of being a solvent for the concerned impurity or contaminant the added wash fluid may be a reagent which will react chemically with the impurity to form a liquid or gaseous fluid which can be more readily removed, upon removal of contaminated wash fluid, than the original impurity can be. It is to be understood, of course, that in most if not all situations the aforedescribed dilution effect will be significantly useful along with any dissolution or reaction effect.

The wash fluid added to washing chamber 38 of concentrator-washer 11 is commingled with through-flowing concentrated slurry by the action of rotor disc elements 60 within the washing chamber and their blades 58 and 58A. This commingling permits the wash fluid to interact with and/or dilute the impurities or contaminants. The wash fluid added through wash fluid inlet 40 (FIG. 1) or 40A (FIG. 4) and commingled with the concentrate is subsequently removed, carrying undesired diluted, dissolved or reacted materials with it, from washing chamber 38 by being passed through filter elements 30 and out the wash fluid drains 41. Then the wash fluid in an at least somewhat contaminated condition is either collected in a wash fluid collection pan 86' (FIG. 1) or delivered through pumps and pipes of the groups 42,43 to earlier stages in the washing chamber (FIG. 4) except for fluid discharged through final drain 41B. In the latter instance, the addition, circulation and removal of wash fluid may be accomplished by utilizing control valves and positive pressure pumps 42, 42A, 42B et seq., on recycling pipe group 43 interconnecting subchambers of the composite washing chamber 38. Alternatively, pumps of the group 42 for pipes of the group 43 may be adjustable vacuum pumps which can be used to vary the rate of filtrate discharge from the filters as well as control the recycling of the wash fluid.

As the operation of concentrator-washer 11 continues, fresh pressurized solids-containing fluid is supplied steadily through inlet spigot 20 from pump 19 while filtrate from this fluid is removed from concentrating chamber 14 through filter elements 30 and drains 84. Fresh wash fluid is continuously supplied to washing chamber 38 of the unitary assembly through wash fluid inlet 40 (FIG. 1) or 40A (FIG. 4), while contaminated wash fluid is removed through wash fluid drains 41 (FIG. 1) or 41B (FIG. 4). A washed concentrated slurry is removed continuously through outlet spigot 22 and its control valve 24.

The rate of feed of solids-containing fluid to inlet spigot 20 is regulated by suitable controls on supply pump 19. The rate of feed of wash fluid to the wash fluid inlet 40 (FIG. 1) or 40A (FIG. 4) is determined by the setting of control valve 94. The rate of concentrate discharge from the unit is established and maintained according to the adjustment of aforementioned control valve 24 on discharge spigot 22. Valve 92 controls the rate of vehicle fluid flow from filtrate collection pan 86, while valve 94 regulates the rate of fresh wash fluid supply to washing chamber 38. Accordingly in operation the settings of the designated valves control the concentration of the leaving slurry, and the mass balance is for steady-state running such that the out-flow rate of the washed concentrated slurry substantially equals the feed discharge rate of pump 19 minus the rate of filtrate output through valve 92. The wash fluid addition is generally completely removed during the washing process considered as a whole, and accordingly does not affect the mass balance to any usual, significant extent.

The filter elements 30 and spacer rings 26 form successive washing subchambers 36A, 36B, 36C and the like within the overall washing chamber 38, the successive subchambers being bounded on either side by a surface of a filter element 30. A vacuum pump may be provided on one or more of the filtrate or wash fluid drains to increase the rate of discharge of wash fluid or filtrate by increasing the pressure difference across the filtering surfaces within the unit.

Referring to the embodiment of FIG. 1, solids-containing fluid flowing within concentrator-washer 11 travels through concentrating chamber 14 making a U-turn around the outer edge of rotor disc element 60A and passing between that element and the housing or shell, and then moving inwardly along the downstream side of rotor disc 60A between it and filter element 30A. The solids-containing fluid then turns around the inner edge of filter element 30A between that filter element and the rotor shaft and passes outwardly between the downstream face of filter element 30A and the upstream face of the second rotor disc element, then around the outer periphery of the latter disc element and so on sinuously and with increasing solids concentration through the concentrating chamber. When the concentrated slurry reaches washing chamber 38 of the unit it has lost much of its initial vehicle fluid content and in that sense has been dried.

As the concentrated slurry passes around the outer edge of the first rotor disc element of the washing chamber, wash fluid flows into it through wash fluid inlet port 40. The fluid therethrough injected commingles with the concentrated slurry to dissolve the soluble impurities or chemically react with the impurities and thereby carry out any required purification of the concentrate, including dilution of contaminants already in liquid form. The wash fluid carrying contaminants with it is then filtered out in the washing chamber 38 through successive filter elements 30 as the concentrate is propelled along past them by upstream pump pressure and the mechanical energy input of the blades 58, 58A on opposite sides of the interposed rotor disc elements.

Because the concentration and washing of the feed material occur within one housing, great process flexibility is possible during the operation of the apparatus of this invention. For example, the solids-containing fluid may be and is customarily contemplated to be pre-concentrated, i.e., substantially freed of its vehicle fluid content, in concentrating chamber 14 before it is washed or decontaminated in washing chamber 38. Alternatively, if the solids-containing fluid have a consistency which requires it, wash fluid inlet ports (not shown) may be provided through the spacers 26 of the housing 12 in way of concentrating chamber 14 so that wash fluid may be injected into that chamber to commingle with and additionally fluidize the solids-containing fluid flowing through it. Further, if wash fluid be injected into the early stages of washing chamber 38 at the same rate as it is removed through those stages filter elements 30 the fluidity of the concentrated slurry may be maintained at the same level until the last few stages of the washing chamber where, if desired, the concentrate may be purged of fluids without any addition of new fluid, and the concentrated slurry thereby raised to its finally desired concentration of solids for discharge from the housing.

As another variation wash fluid may be injected through alternate wash fluid ports 40 in the washing chamber 38, that is, ports spaced apart by at least two stages or subchambers. The concentrated slurry will then have contaminated wash fluid and residual vehicle fluid, too, removed within not only the subchamber in which the wash fluid is added but also at least the next adjacent subchamber downstream. Thus the concentrate, while being washed by the addition of wash fluid in one subchamber, is dried within the next subchamber of the washing chamber. Accordingly, a concentrate which is still rather fluidized upon entry into the washing chamber 38 can be both washed and progressively dried while passing through the washing chamber to provide a product concentrate at outlet 22 which is both dried and washed as compared to the somewhat concentrated slurry first entering the washing chamber.

CONCLUSION

Because of the unique construction and operational attributes of the apparatus herein illustrated and described, various process variables are possible of accommodation with the concentrator-washer of this invention. Thus, for a particular concentrate, substantial amounts of fresh wash fluid may be injected at a single initial or intermediate point in the washing chamber 38 through a port 40. The concentrate at that point may have achieved its desired degree of dryness, so that both the wash fluid added and the undesired materials, e.g., salts, dissolved and/or diluted by that fluid are removed from washing chamber 38 through filter elements 30 in several downstream subchambers of the washing chamber, thereby wringing-out and, in effect, redrying the rewetted concentrate. Alternatively, the concentrated slurry may be treated by injecting a limited amount of fresh wash liquid at a sequential plurality of inlet ports 40 (FIG. 4) with the amount injected at any particular port being essentially wrung out of the concentrate and drained from the washing chamber along with any undesired materials picked up by it prior to arrival of the concentrate in way of the next wash fluid inlet port. Thus the washing operation of this procedure comprises alternating steps of limited rewetting and restoration drying.

In another functional mode or arrangement a limited amount of fresh wash fluid may be injected close to the concentrate discharge end of the washing chamber through injection port 40A (FIG. 4) where the concentrated slurry has achieved its approximate degree of desired dryness. That fluid is then removed through the filter element 30B in the subchamber 36 downstream of the injection port 40A, and the now-contaminated wash fluid is injected next into earlier subchamber, that is, one upstream from the initial injection point. This process of injection, removal and re-injection may be continued with the wash fluid being counter-flowed through the concentrator-washer and becoming increasingly contaminated as it is moved upstream.

To illustrate further the adaptability of the present invention to various types of feed material consideration may be given to the situation of solids-containing fluid supplied to the concentrator-washer having a concentration of solids in excess of 50%, with that material lacking adequate fluidity to be processed in a rotary concentrator-washer without the use of excessive power. In such a situation wash fluid may be added to an initial stage or subchamber of the apparatus to increase the fluidity of the feed material and at the same time wash impurities from it. If the concentration of the material initially fed to the concentrator-washer be, on the other hand, less than 50% solids it may be desirable to concentrate that material further before undertaking to wash it to remove impurities.

Where the solids concentration of a feed material is in the relatively low range 1% – 20% it may be desirable not to add wash fluid until the concentration approaches 50% solids following substantial processing of the material in a concentrating chamber. In such a situation the gross amount of fluid impurities in the original feed material would be removed before the first washing stage but non-fluid impurities might remain and the latter could be removed in the washing chamber of the apparatus. If the rate of wash fluid addition in the wasing chamber corresponds to the rate of filtrate withdrawal in and from the involved washing stage, the injected washing fluid may tend initially to reduce the concentration of solids in the material being processed, but the immediately subsequent removal at the same rate of contaminated wash fluid will tend in turn to maintain a constant level of concentration from one side of the involved washing stage to the other.

Just as it may be desirable not to inject wash fluid into the initial stages of the concentrating chamber but instead to preconcentrate a feed slurry before beginning washing, it may be desirable not to inject wash fluid into one or more of the final stages of the concentrator-washer if it be desired to wring out or dry the concentrated slurry thoroughly, i.e., increase its solids concentration appreciably just prior to discharge of the concentrate from the unit.

Another operative condition of the apparatus of this invention may call for injecting wash fluid at every other stage in the washing chamber rather than at every stage. In that circumstance different solvents or other wash fluids may be used for various stages so that a different impurity is dissolved or diluted from the concentrate at the respective stages. A related consideration is that while a single pump with suitable control valves may be used to supply wash fluid to all of the stages in the washing chamber at which injection of wash fluid is desired, a separate pump for each such stage would have the advantage that each pump would function as a fluid metering and control device for the wash fluid supplied to its respective stage and, by use of separate pumps, more than a single wash fluid may be used for the respective stages.

From the foregoing it is clear that this invention provides a unitary or single unit concentrator-washer for continuously and dynamically separating a concentrated slurry and a filtrate from a solids-containing fluid and removing impurities from the concentrate so formed. At various places herein the expressions "filter element" and "filtering surface" have been used in connection with the physical components and the operational conditions with the physical components and the operational conditions of the concentrator-waher disclosed. It is to be understood that those expressions have been used only for the sake of convenience and clarity to identify and describe particular components of a compound machine. For purposes of this specification, including its claims, the expressions are to be considered generic; that is, "filter element" is to be considered to relate to a filtering device having a filtering surface, or to a filtering support surface for a filtering element having a filtering surface. Similarly "filtering surface" is to be considered as relating to a separate material which is added to a filter support surface or filter element, or to a filtering surface which is an integral part of a filter support surface or filter element.

In the preceding description and for the several embodiments disclosed it is to be understood that various elements described as being stationary or moving in the illustrations given can be modified to be mobile or stationary, provided only that the inventive concepts embodied in this disclosure be carried out. Thus the filter elements may be made to rotate relative to the housing in certain arrangements while the interposed disc elements may be made stationary relative to the housing. Similarly elements which are particularly illustrated and/or described as being solid or perforated may also be changed in design, provided as before that the inventive concepts of this disclosure be incorporated in the overall construction of the apparatus and observed in the course of its operation.

Protection by Letters Patent of this invention in all its aspects as the same are set forth in the appended claims is sought to the broadest extent that the prior art allows.

I claim as my invention:

1. A dynamic concentrator-washer for separating a filtrate and a concentrated slurry from a solids-containing fluid and washing the concentrated slurry with a wash fluid prior to its discharge from the concentrator-washer, said concentrator-washer comprising (1) a housing defining an enclosure having a concentrating chamber and a washing chamber; (2) a first inlet in said housing for the introduction into said enclosure of a pressurized solids-containing fluid; (3) at least one filter element mounted within said concentrating chamber and defining a filter chamber having at least one filtering surface thereon in the flow path of solids-containing fluid introduced into said enclosure through said first inlet, said filtering surface being disposed to pass a filtrate therethrough into said filter chamber from solids-containing fluid within said housing; (4) a first outlet in said housing, said outlet being connected to the filter chamber of said filter element for discharging filtrate from said concentrating chamber and said filter element and thereby providing a concentrate slurry of solids-containing fluid within said concentrating chamber; (5) at least one other inlet in said housing, said other inlet communicating with said enclosure for the introduction in said enclosure of a wash fluid to provide a mix within said enclosure of the wash fluid and the concentrated slurry; (6) at least one other filter element, that element being mounted within said washing chamber and defining a filter chamber having at least one filtering surface thereon in the flow path of said mix of concentrated slurry and wash fluid, that filtering surface being disposed to pass wash fluid from said mix therethrough and into that filter chamber; (7) a second outlet in said housing, that outlet being connected to the filter chamber of said other filter element for discharging wash fluid from said washing chamber and said other filter element and thereby providing a washed concentrated slurry within said housing; (8) a third outlet in said housing, that outlet being in the flow path of the washed concentrated slurry to discharge that slurry from the housing; and (9) a rotor means rotatably mounted in said housing on a longitudinal axis thereof and extending through said concentrating chamber and said washing chamber and disposed to have a drive means connected to it for imposing rotation upon it, said rotor means having at least two radial elements extending radially outwardly of said longitudinal axis in substantially parallel, spaced apart relation to the filtering surfaces of each of said filter elements respectively toward an interior surface of said housing but terminating in spaced relation thereto sufficient for fluid flow therebetween.

2. A dynamic concentrator-washer as set forth in claim 1 wherein (i) said housing includes a front wall adjacent an end of said longitudinal axis and a rear wall adjacent the opposite end thereof; (ii) said first inlet is formed in said front wall; (iii) said concentrating chamber extends at least between said front wall and said one filter element and contains at least one of said radial elements; (iv) said third outlet is formed in said rear wall; and (v) said washing chamber extends at least between said rear wall and said other filter element and contains at least another of said radial elements.

3. A dynamic concentrator-washer as set forth in claim 2 comprising a plurality of said filter elements within said concentrating chamber, a plurality of said filter elements within said washing chamber, and a plurality of said radial elements in alternating relation with said filter elements in both said concentrating chamber and said washing chamber.

4. A dynamic concentrator-washer as set forth in claim 2 wherein each said filter element has a pair of opposed filtering surfaces.

5. A dynamic concentrator-washer as set forth in claim 1 in which said rotor means has additionally at least one blade on at least one side of at least one of said radial elements projecting generally parallel to said axis and laterally toward a said filtering surface.

6. A dynamic concentrator-washer as set forth in claim 5 in which said rotor means has at least one blade on each side of at least one of said radial elements, said blades being configured to impel flow of fluid within said housing radially outwardly along one side of that radial element and radially inwardly along the other side thereof.

7. A dynamic concentrator-washer as set forth in claim 1 which further comprises means connected to said third outlet for controlling the discharge of washed concentrated slurry from that outlet.

8. A dynamic concentrator-washer as set forth in claim 1 wherein said rotor means comprises a concentrating-chamber-shaft-portion extending through said concentrating chamber and a separate washing-chamber-shaft-portion extending through said washing chamber, said shaft portions being disposed to have separate drive means connected to them and different rotational speeds imposed upon them.

9. A dynamic concentrator-washer as set forth in claim 1 wherein a said filter element has a pair of opposed filtering surfaces and separates said concentrating chamber from said washing chamber with one of said opposed filtering surfaces facing said concentrating chamber and the other thereof facing said washing chamber.

10. A dynamic concentrator-washer as set forth in claim 1 which is characterized by (i) at least one further inlet in said housing in addition to said other inlet for the introduction into said enclosure of a wash fluid, and (ii) at least one further outlet in said housing in addition to said second outlet for discharging wash fluid from said washing chamber, said one further inlet and said one further outlet both being located in said housing between said second outlet and said third outlet.

11. A dynamic concentrator-washer for providing a filtrate and a washed concentrate of solids from a solids-containing fluid, said concentrator-washer comprising (1) a housing defining an enclosed chamber and having one end and another opposite end; (2) a first inlet in said housing adjacent said one end thereof for the introduction of a pressurized solids-containing fluid into said chamber; (3) a second inlet in said housing spaced apart from said first inlet for the introduction of fresh wash fluid into said chamber to intermix with solids-containing fluid within said chamber; (4) a plurality of filter elements in serial, spaced apart relation within said chamber, each said filter element having at least one filtering surface for passing therethrough according to location of any particular filter element (i) filtrate from a solids-containing fluid, (ii) wash fluid from an intermix of solids-containing fluid and wash fluid, or (iii) both filtrate from solids-containing fluid and wash fluid from an intermix of solids-containing fluid and wash fluid, while retaining a concentrate of solids either unwashed or washed; (5) a first outlet means in said housing connected to said filter elements for discharging filtrate and wash fluid from said enclosed chamber and said filter elements; (6) a second outlet in said housing adjacent said other end thereof for discharging a washed concentrate of solids from said chamber; and (7) a rotor means rotatably mounted in said housing and extending substantially from said one end to said other end thereof through said enclosed chamber and disposed to have a drive means connected to it for imposing rotation upon it, said rotor means including a plurality of radially extensive elements disposed serially between successive ones of said filter elements in substantially parallel, spaced apart relation to the filtering surfaces thereof and terminating in spaced relation to an interior surface of said housing sufficient for fluid flow therebetween.

12. A dynamic concentrator-washer as set forth in claim 11 in which said rotor means includes additionally at least one blade on at least one side of each of said radially extensive elements projecting laterally therefrom toward a filtering surface of an adjacent filter element.

13. A dynamic concentrator-washer as set forth in claim 12 in which said blades are configured to impel flow of fluid within said housing radially between said radially extensive elements and adjacent filter elements.

14. A dynamic concentrator-washer as set forth in claim 11 which further comprises (i) a third inlet in said housing located between said first and second inlets therein, and (ii) pumping means connected between at least a portion of said first outlet means and said third inlet for pumping at least a portion of the discharge from said first outlet means to said third inlet for reintroduction of that portion of said discharge into said chamber at a location upstream from the location of original introduction of fresh wash fluid into said chamber.

15. A dynamic concentrator-washer as set forth in claim 14 which further comprises a plurality of means between said first and second inlets for reintroducing discharges into said chamber at a plurality of locations between the location of the respective discharge and that of said first inlet.

16. A dynamic process for separating a concentrated slurry and a filtrate from a solids-containing fluid and, within a given housing and on a continuous basis, washing undesired material from the concentrated slurry to provide a washed concentrated slurry, said process comprising the steps of (1) introducing a solids-containing fluid under pressure into one end of an enclosed housing characterized by said one end and another, opposite end and containing (i) a plurality of serially arranged, spaced apart filter elements each comprising a filter chamber having at least one filtering surface with the interior of each filter chamber being in fluid flow communication with the exterior of said housing and said filtering surfaces being disposed in a path wherealong fluid may flow through said housing from said one end to said other end thereof, and (ii) rotor means including a plurality of radially extensive elements arranged serially between successive ones of said filter elements in substantially parallel, spaced apart relation to the filtering surfaces thereof and terminating in spaced relation to an interior surface of said housing sufficient for fluid flow therebetween; (2) the solids-containing fluid past and against the filtering surface of at least a first filter element and thereby and thereat effecting a separation of filtrate from the solids-containing fluid and providing a concentrated slurry including some undesired material within the housing; (3) discharging the separated filtrate from the interior of said first filter element and said housing; (4) introducing wash fluid into said housing and intermixing the same therein with said concentrated slurry and included undesired material; (5) flowing the intermix of wash fluid, concentrated slurry and undesired material past and against the filtering surface of at least a second filter element and thereby and thereat effecting a separation of wash fluid and undesired material from the concentrated slurry and providing a washed concentrated slurry within the housing; (6) discharging the separated wash fluid and undesired material from the interior of said second filter element and said housing; and (7) discharging the washed concentrated slurry from the housing at said other end thereof, said process comprising the further step of continuously rotating said rotor means to impel a radial flow of both solids-containing fluid and the intermix of wash fluid, concentrated slurry and undesired material across the filtering surfaces of said first and second filter elements respectively.

17. A dynamic process as set forth in claim 16 in which the radial elements of said rotor means which impel a radial flow of solids-containing fluid are rotated at one speed and the radial elements of said rotor means which impel a radial flow of said intermix of wash fluid, concentrated slurry and undesired material are rotated at another, different speed.

18. A dynamic process as set forth in claim 16 in which (i) wash fluid is introduced into said enclosed housing at a plurality of locations along the length between the ends thereof and intermixed therein with the concentrated slurry, and (ii) separated wash fluid and undesired material are discharged from the housing at a plurality of locations along its said length which alternate with the locations at which wash fluid is introduced.

19. A dynamic process as set forth in claim 18 in which (i) fresh wash fluid is introduced into said enclosed housing only at the wash fluid introduction location closest to said other end thereof at which washed concentrated slurry is discharged from said housing, and (ii) at the next adjacent wash fluid introduction location there is introduced separated wash fluid and undesired material discharged from said housing at the wash fluid discharge location closest to said other end thereof at which washed concentrated slurry is discharged from said housing.

20. A dynamic process as set forth in claim 18 in which the one of said plurality of locations at which wash fluid is introduced into said enclosed housing closest to said other end thereof at which washed concentrated slurry is discharged from said housing is spaced from that other end by at least two filter elements and the radially extensive elements of the rotor means particularly associated therewith whereby a final intensified effect of separating fluid material from said concentrated slurry is achieved prior to discharge of that slurry from the housing.

* * * * *